(12) United States Patent
Baig

(10) Patent No.: US 12,026,190 B2
(45) Date of Patent: *Jul. 2, 2024

(54) ACCESS POINTS FOR MAPS

(71) Applicant: Google LLC, Mountain View, CA (US)

(72) Inventor: Haroon Baig, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,997

(22) Filed: Dec. 10, 2020

(65) Prior Publication Data

US 2021/0133227 A1    May 6, 2021

Related U.S. Application Data

(63) Continuation of application No. 16/050,408, filed on Jul. 31, 2018, now Pat. No. 10,896,217, which is a continuation of application No. 14/940,902, filed on Nov. 13, 2015, now Pat. No. 10,055,414.

(51) Int. Cl.
| | |
|---|---|
| *G06F 16/44* | (2019.01) |
| *G01C 21/36* | (2006.01) |
| *G06F 16/245* | (2019.01) |
| *G06F 16/2457* | (2019.01) |
| *G06F 16/29* | (2019.01) |
| *G06F 16/84* | (2019.01) |

(52) U.S. Cl.
CPC ....... *G06F 16/444* (2019.01); *G01C 21/3667* (2013.01); *G06F 16/24578* (2019.01); *G06F 16/29* (2019.01); *G06F 16/84* (2019.01)

(58) Field of Classification Search
None
See application file for complete search history.

(56) References Cited

U.S. PATENT DOCUMENTS

| | | | |
|---|---|---|---|
| 6,401,030 B1 | 6/2002 | Watanabe | |
| 7,538,690 B1 * | 5/2009 | Kaplan | ............... G06F 16/245 |
| 8,566,029 B1 | 10/2013 | Lopatenko et al. | |
| 8,671,106 B1 | 3/2014 | Lee et al. | |
| 8,949,250 B1 | 2/2015 | Garg | |
| 9,157,745 B2 | 10/2015 | Das et al. | |

(Continued)

FOREIGN PATENT DOCUMENTS

| | | |
|---|---|---|
| CN | 101929870 | 12/2010 |
| CN | 102175252 | 12/2012 |

(Continued)

OTHER PUBLICATIONS

EP Office Action in European Application No. 16 785 311.8, dated Jul. 24, 2019, 8 pages.

(Continued)

*Primary Examiner* — Son T Hoang
(74) *Attorney, Agent, or Firm* — DORITY & MANNING P.A.

(57) ABSTRACT

Methods, systems, and apparatus, for providing map data that causes a user device to display a map of an area that includes a physical entity location and a access locations for the physical entity, wherein the physical entity location is indicated by an icon of a first type and each access location is indicated by an icon of a second type that is different from the icon of the first type.

19 Claims, 10 Drawing Sheets

(56) References Cited

U.S. PATENT DOCUMENTS

| | | | |
|---|---|---|---|
| 2001/0049580 A1 | 12/2001 | Kusano et al. | |
| 2002/0133289 A1* | 9/2002 | Miyaki | G06F 16/29 |
| 2004/0049340 A1* | 3/2004 | Usui | G06F 16/30 |
| 2008/0163073 A1 | 7/2008 | Becker et al. | |
| 2009/0143976 A1* | 6/2009 | Geelen | G06F 16/245 |
| 2010/0146436 A1* | 6/2010 | Jakobson | G06F 16/951 |
| 2010/0305842 A1 | 12/2010 | Feng | |
| 2011/0106435 A1* | 5/2011 | Stanton | G06F 16/245 |
| 2012/0084000 A1 | 4/2012 | Wang et al. | |
| 2012/0323481 A1* | 12/2012 | Bhattiprolu | G06F 16/245 |
| 2013/0326407 A1* | 12/2013 | van Os | G06F 16/9038 |
| 2014/0163861 A1* | 6/2014 | Beaurepaire | G06F 16/35 |
| 2014/0274107 A1* | 9/2014 | Rados | G06F 16/29 |
| 2014/0320318 A1* | 10/2014 | Victor | G06F 16/84 |
| 2015/0261785 A1* | 9/2015 | Ma | G06F 16/904 |
| 2015/0294431 A1* | 10/2015 | Fiorucci | G06F 16/44 |
| 2016/0178385 A1* | 6/2016 | Zhao | G06F 16/90 |
| 2016/0238397 A1* | 8/2016 | Caira | G06F 16/29 |
| 2016/0290820 A1* | 10/2016 | Nakagawa | G06F 16/444 |
| 2016/0356610 A1* | 12/2016 | O'Beirne | G06F 16/245 |
| 2016/0358471 A1 | 12/2016 | Haj | |
| 2017/0115124 A1* | 4/2017 | Mullen | G06F 16/84 |
| 2018/0357899 A1* | 12/2018 | Krivacic | G06F 16/28 |

FOREIGN PATENT DOCUMENTS

| | | |
|---|---|---|
| CN | 104215254 | 12/2014 |
| CN | 104949670 | 9/2015 |
| JP | 2011226781 | 11/2011 |
| WO | 2008/108532 | 9/2008 |
| WO | WO2008/108532 | 9/2008 |

OTHER PUBLICATIONS

EP Office Action in European Application No. 16785311, dated May 14, 2020, 16 pages.
EP Summons to attend oral proceedings pursuant to Rule 115(2) EPC in European Appln No. 16785311.8, dated Jan. 24, 2020, 10 pages.
IN Office Action in Indian Application No. 201847004898, dated Dec. 12, 2020, 6 pages (with English translation).
International Preliminary Report on Patentability issued in International Application No. PCT/US2016/056368, dated May 24, 2018, 9 pages.
International Search Report and Written Opinion in International Application No. PCT/US2016/056368, dated Dec. 21, 2016, 13 pages.
CN Office Action in Chinese Application No. 201680048375.2, dated Mar. 11, 2021, 10 pages (with English translation).
CN Notice of Allowance in Chinese Application No. 201680048375. 2, dated May 18, 2021, 3 pages (with English translation).
GB Office Action in United Kingdom Appln. No. 1801714.5, dated Jul. 1, 2021, 5 pages.
Office Action in United Kingdom Appln. No. 1801714.5, dated Aug. 27, 2021, 4 pages.
Machine Translated Chinese Search Report Corresponding to Application No. 2021108815231 on Mar. 13, 2024.
CN Translation of Lin et al., "Research on Implementation Technology of Map Annotation based on Open Map Engine", Journal of East China University of Technology (Natural Science), vol. 38, No. 01, Mar. 31, 2015, pp. 110-115.

* cited by examiner

ACCESS POINTS FOR MAPS

CROSS-REFERENCE TO RELATED APPLICATION

This application is a continuation of U.S. application Ser. No. 16/050,408, filed Jul. 31, 2018, which is a continuation of U.S. application Ser. No. 14/940,902 filed Nov. 13, 2015, the contents of which are incorporated by reference herein.

BACKGROUND

Interactive geographic maps are now available on the majority of mobile devices and computers. A user can view an interactive geographic map that displays a location, which can include information pertaining to surrounding businesses, business addresses, contact information, driving directions and otherwise that relate to the location displayed on the map. Some interactive maps allow users to manipulate the maps to view adjacent sections, zoom in or out, and/or to view satellite images of the location.

Interactive mapping systems may provide query suggestions in response to received queries (or partially received queries). The query suggestions often aid users in refining search queries and discovering search queries.

Mapping services, however, provide query suggestions for and results for distinct physical locations. While such information is helpful, mapping information for the distinct physical locations, however, may not provide the user with location information that may be of additional interest to the user. For example, an airport may have multiple entrances, but the location of the airport, as resolved to a map address, may be hundreds of meters from a location that would be of most interest to a particular user.

SUMMARY

In general, one innovative aspect of the subject matter described in this specification can be embodied in methods that include the actions of determining, by a server, a plurality of map query suggestions responsive to a query input received from a user device, each map query suggestion based on the query input and identifying a physical entity that is located at a physical entity location; determining that a physical entity identified by a map query suggestion has a plurality of corresponding access locations, each access location being a location of an access point that facilitates physical ingress and/or egress to the physical entity, and in response: ranking the access locations for the physical entity relative to each other to generate a ranking of the accessing locations, and generating access location query suggestions for the map query suggestion, each access location query suggestion identifying one of the accession locations for the physical entity; and providing, by the server and to the user device, the map query suggestions and the access location query suggestions in a format that causes the user device to display the access location query suggestions grouped subordinate to the map query suggestion that identifies the physical entity having the plurality of corresponding access points, and wherein the access location query suggestions are provided in an order according to the ranking of the access locations. Other embodiments of this aspect include corresponding systems, apparatus, and computer programs, configured to perform the actions of the methods, encoded on computer storage devices.

Another innovative aspect of the subject matter described in this specification can be embodied in methods that include the actions of determining, by a server, in response to a map query received from a user device and that identifies physical entity that is located at a physical entity location: determining that the physical entity identified by a map query suggestion has a plurality of corresponding access locations, each access location being a location of an access point that facilitates physical ingress and/or egress to the physical entity, and in response: ranking the access locations for the physical entity relative to each other to generate a ranking of the accessing locations, and providing, by the server and to the user device, data that causes the user device to display a map of an area that includes the physical entity location and the access locations, wherein the physical entity location is indicated by an icon of a first type and each access location is indicated by an icon of a second type that is different from the icon of the first type. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving, from each user device of a plurality of user devices for a plurality of corresponding times, location data describing a location of the user device at the corresponding time; determining, from the location data from the plurality of user devices at the plurality of corresponding times, path data for each of the user devices and relative to a physical entity location of a physical entity; determining, from the path data, mergers of a plurality of paths for a plurality of user devices, where each merger of a plurality of paths is based on the paths of the user devices that belong to the merger being within a threshold distance of each other and having respective directions being within a threshold parallelism; and for each merger of the plurality of paths, determining a location based on location determined form the relative locations of the user devices being within the threshold distance of each other and having the respective directions being within the threshold parallelism; determining each location determined for each merger is an access location for an access point for the physical entity; and storing the determined access location in an index in association with the physical entity location of the physical entity. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The user interface displays access locations in a visual manner that conveys the relation of the access locations to an entity location. This provides users an intuitive interface that quickly conveys more refined locations than their initial query, which helps them to get more accurate results both in terms of geographic location on the map as well as route data. It does so by intuitively showing the relation between access locations and the entity locations in the users' natural search flow without adding an extra step. When displayed in map form, the user interface also provide an interaction model that allows a user to request route data to each access location. The interaction model allows users to discover route that will lead the users to the access point of their choosing, which also satisfies users' informational needs.

The details of one or more embodiments of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

Figure 1A:
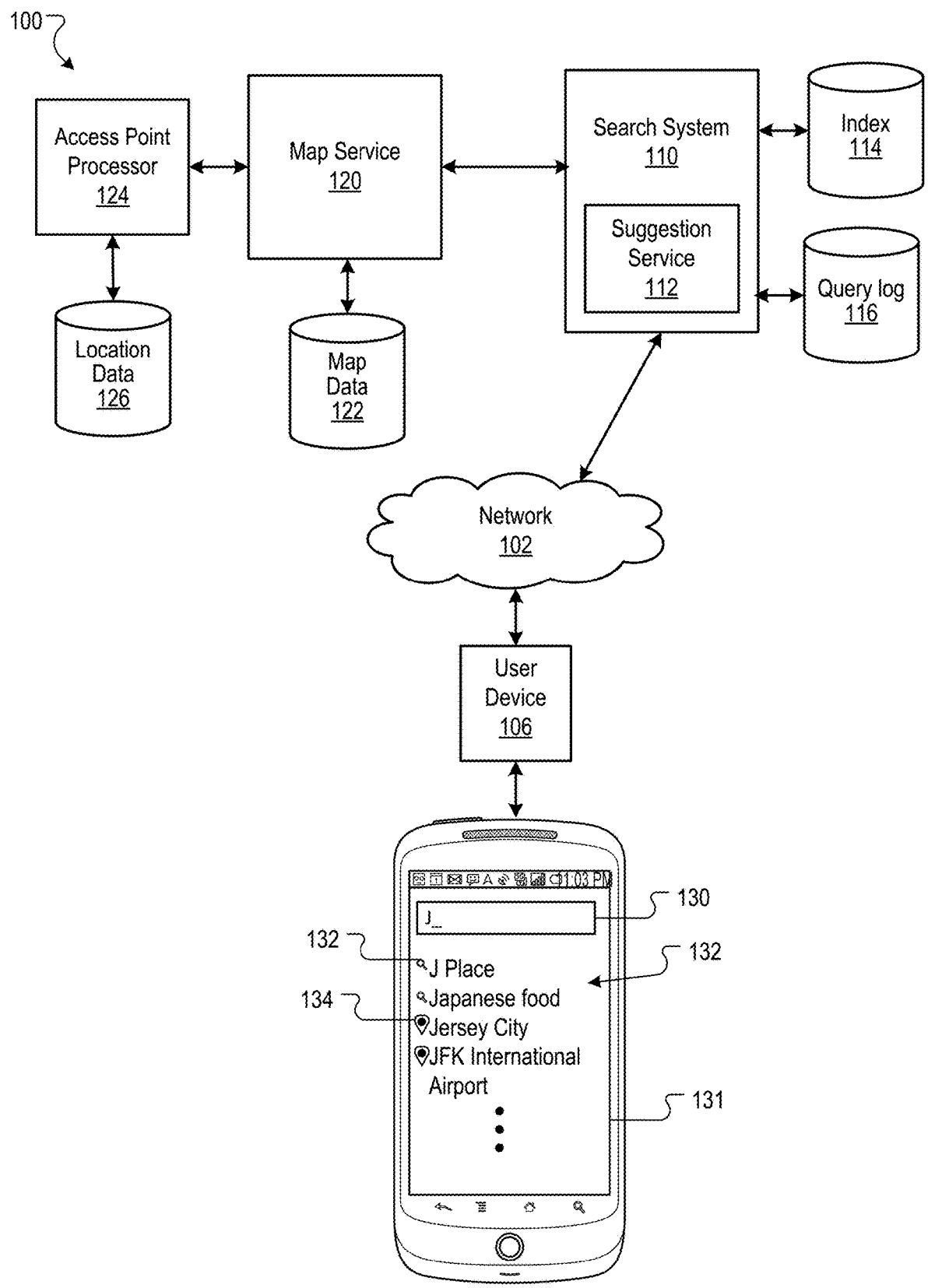
FIG. 1A is a block diagram of an example environment in which a map service provides access point map query suggestions.

FIG. 1A is a block diagram of an example environment in which a map service provide access point map query suggestions. A computer network 102, such as the Internet, or a combination thereof, provides for data communication between electronic devices and systems. The computer network 102 may also include, or be in data communication with, one or more wireless networks by means of one or more gateways.

User device 106 is an electronic device that is under the control of a user and is capable of requesting and receiving resources over the network 102. Example user devices 106 include personal computers, mobile communication devices, wearable devices, and other devices that can send and receive data over the network 102. In the example of FIG. 1, the user device 106 is a smartphone.

The search engine 110 allows users to search resources of the web. To facilitate searching of web resources, the search engine 110 identifies the resources by crawling publisher web sites and indexing the resources provided by the publisher web sited. The indexed and, optionally, cached copies of the resources are stored in a web corpus index 114.

The client device 106 submits search queries to the search engine 110. The search queries are submitted in the form of a search request that includes the search query as it is being entered. For example, each time a character is input as part of the search query, another search request is sent to the search system 110. The search system 110 uses a suggestion service 112 to generate search query suggestions that are displayed to the user as the user enters the query. Any appropriate suggestion generation process can be used. Suggestions may be selected based on stemming from the currently input characters, or based on a semantic relation to the terms currently input as the search query, or based on any other appropriate suggestion algorithm.

The search system 110 is also in data communication with a map service 120. The map service 120 provides maps of locations that resolve to queries that invoke a search of map data 122. Examples of queries that invoke searches of the map data 122 are queries that specify addresses, cites, states, landmarks, or other points of interests that resolve to physical locations.

The suggestion service 112 determines whether a query suggestion invokes a web corpus index 114 search operation or a map data 122 search. For example, as shown in FIG. 1A, a query input "J" in input in an input field 130 in search user interface 131. The suggestion service 112 has provided several web query suggestions, as indicated by the web search icon 132, and several map query suggestions, as indicated by the map icon 134. Should a user select one of the web query suggestions, the search system 110 will perform a search of the web corpus index 114 using the selected query suggestion and provide responsive web search results to the user device 106. Likewise, should the user select a map query suggestion, the map service 120 will perform a search of the map data 120 and provide responsive map search results to the user device 106.

In some implementations, the queries selected from client devices 106 are stored in query logs 114. Click data for the queries are also stored in query logs 114. The query logs 114 can thus be used by the search engine 110 to determine the sequence of queries submitted by the client devices, the actions taken in response to the queries, how often the queries are submitted, and the relative frequency of selection of the query suggestions.

The map data 122 stores data identifying physical entities, e.g., cities, businesses, places of interests, etc., and the corresponding locations of each physical entity. Some physical entities may have multiple access locations. An access location is a location of an access point that facilitates physical ingress and egress to the physical entity. An access point can be, for example, an entryway into a building, such as main entries into terminals of an airport; a parking location, such as a parking deck for a building or a parking lot for a park; and other such access points that facilitate a person's ingress and egress to a physical location.

Data describing access points for a physical entity can be provided by a party associated with the physical entity. For example, a building manager can provide data describing the access points of a building to the map service 120; a mall management company can provide data describing parking lot locations and entries/exits of a shopping mall, and so on. In other implementations, an access point processor 124 can process location data provided by user devices 106 to discover access points and locations for a physical entity. This latter implementation is described with reference to FIGS. 6 and 7 below.

Figure 1B:
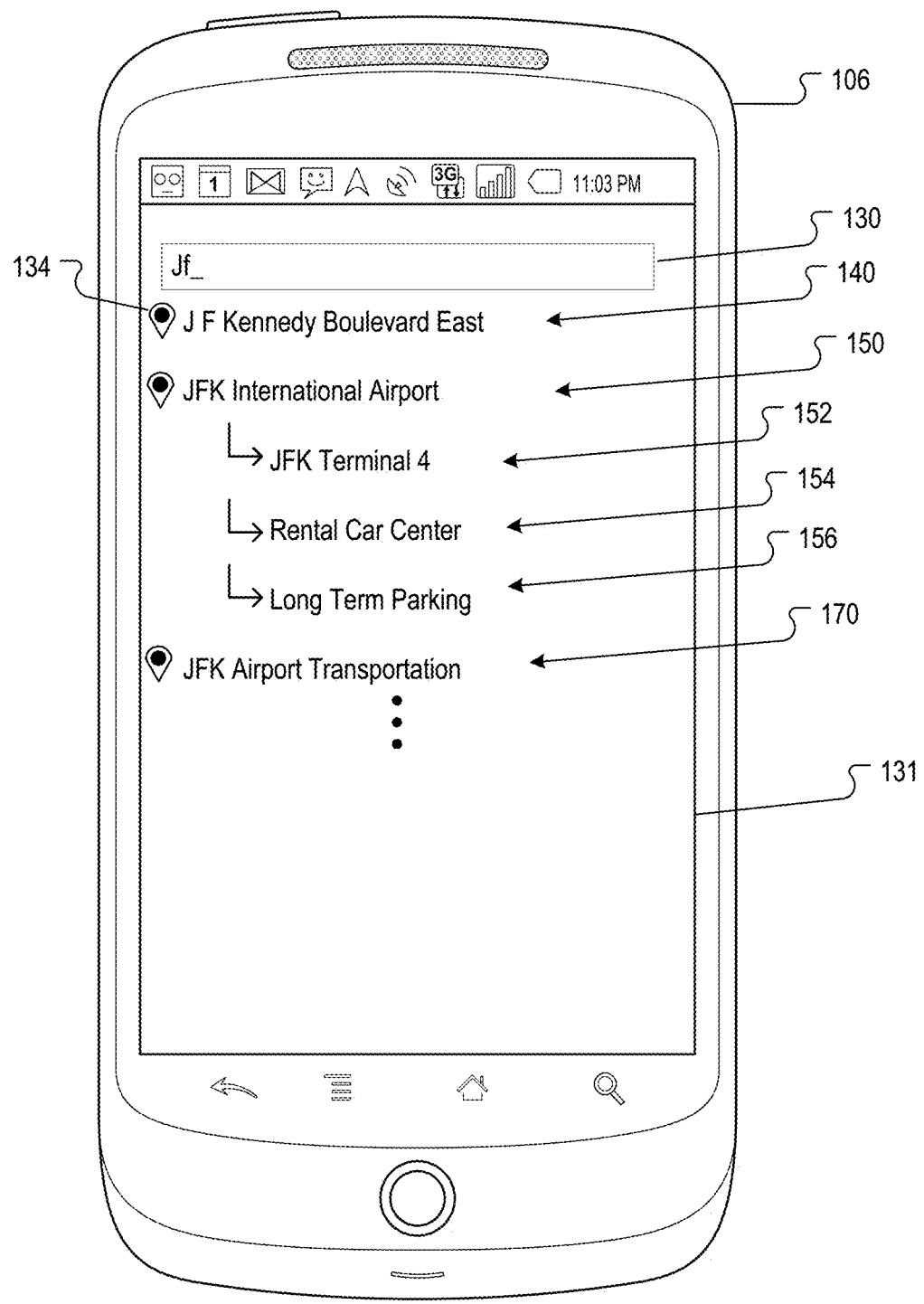
FIGS. 1B and 1C are detailed illustrations of map query suggestions in a user interface.
Figure 1C:
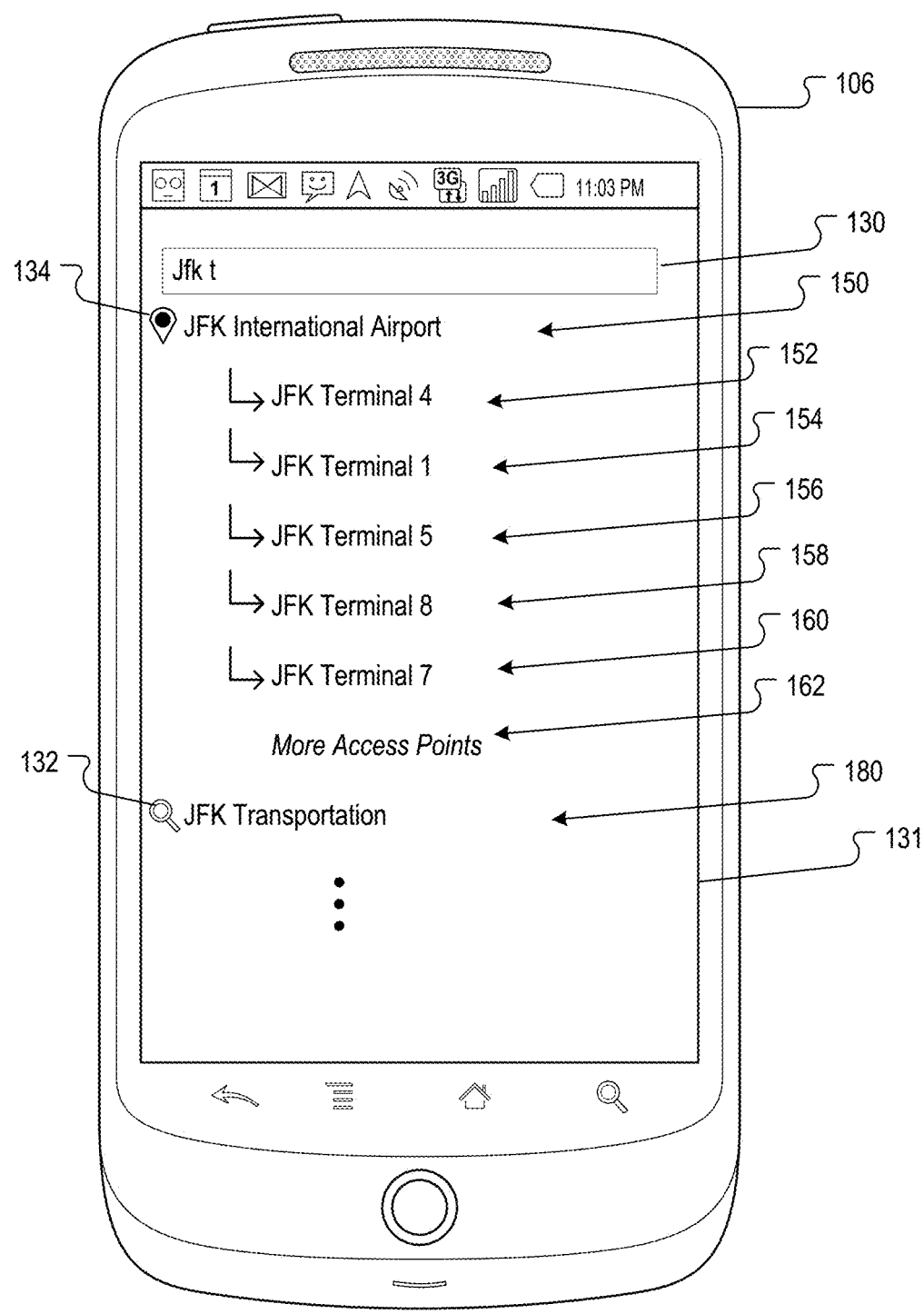
Figure 2:
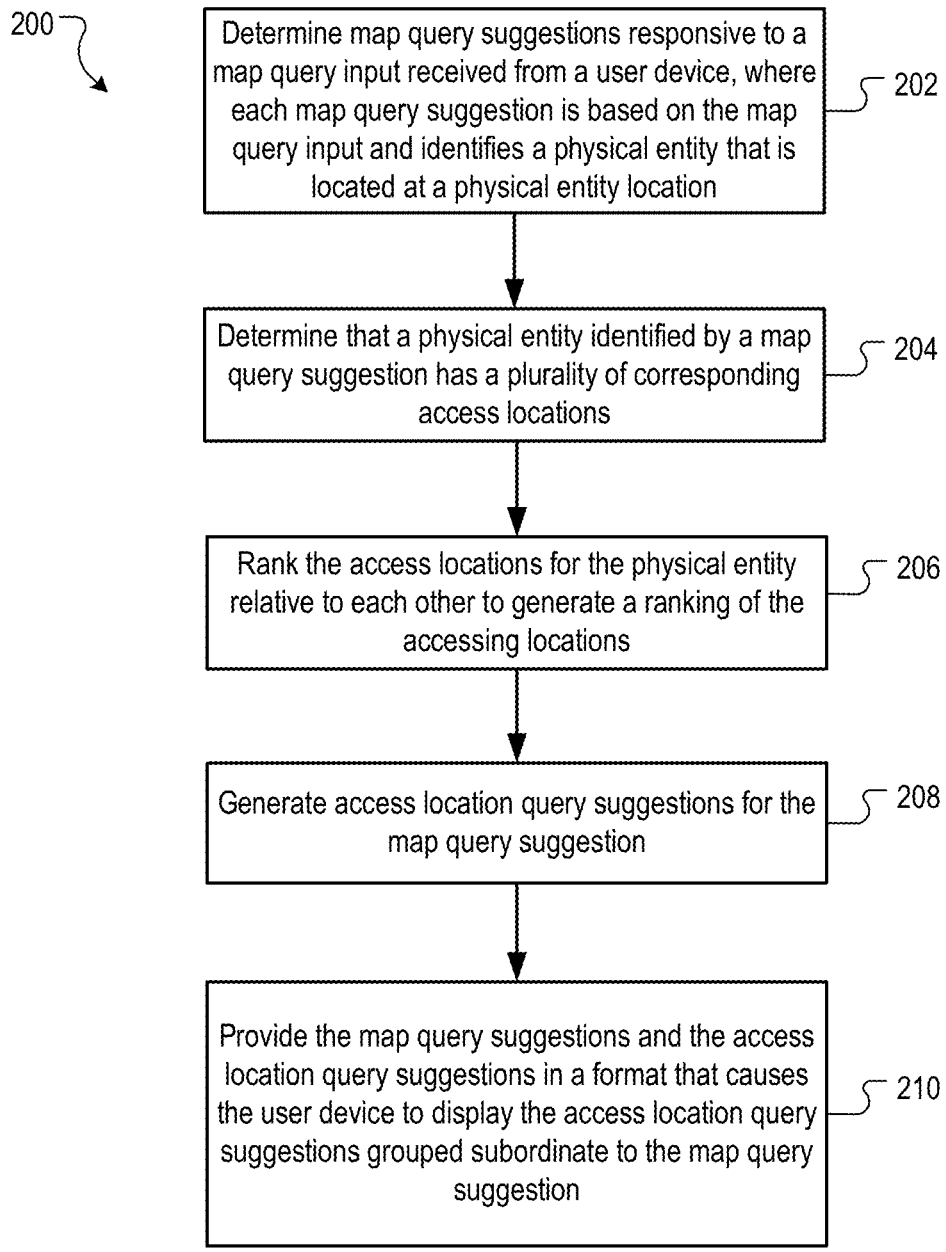
FIG. 2 is a flow diagram of an example process for providing map query suggestions that include access location query suggestions.

With reference to FIG. 1A, assume that the user continues to enter query inputs at the user device 106, which causes the user device 106 to receive additional query suggestions from the suggestion service 112. FIGS. 1B and 1C are detailed illustrations of map query suggestions in a user interface 131 in response to continued user inputs. Operation of the processing of the query suggestions is described with reference to FIG. 2, which is a flow diagram of an example process 200 for providing map query suggestions that include access location query suggestions. The process 200 can be implemented in the suggestion service 112 that is in data communication with the map service 120.

The process 200 determines map query suggestions responsive to a query input received from a user device, where each map query suggestion is based on the query input and identifies a physical entity that is located at a physical entity location (202). For example, in FIG. 1A, in response to the query input "J", the suggestion service 112 generates query suggestions, two of which correspond to map query inputs—"Jersey City" and "JFK International Airport." As the user continues to type, inputting "JF," more map query suggestions 140, 150 and 170 are generated, as shown in FIG. 1B.

The process 200 determines that a physical entity identified by a map query suggestion has a plurality of corresponding access locations (204). For example, the suggestion service 112 accesses the map data 112, and determines that the query suggestion "JFK International Airport" has corresponding access locations that are associated with the physical entity location of the airport. Each identified access location is eligible to be identified by an access location query suggestion. However, when multiple access locations are identified for a physical entity location, the suggestion service 112 will rank the access locations to determine which access locations will be identified by access location query suggestions and the order by which the access location query suggestions will be provided.

The process 200 ranks the access locations for the physical entity relative to each other to generate a ranking of the accessing locations (206). The access locations can be ranked by a variety of different algorithms. For example, the access locations can be ranked based on frequencies of selections of access location query suggestions for each access location. The frequencies of selections can be determined by accessing the query log 116.

Another way of ranking the access locations is by ranking the access locations based on user data for a user of the user device, where the user data is indicative of a user-specific utility for each access location. For example, assume a first user has booked a flight on an airline that is located at terminal 4 of JFK International Airport, and that the user has provided this information, or otherwise allowed access to this information, to the search system 110. The suggestion service will rank the access location for terminal 4 the highest, and will thus provide the access location query suggestions 152 and 154 in the order as depicted in FIG. 1B.

By way of another example, assume a second user has a rental car reservation at a rental agency located at JFK International Airport, and that the user has provided this information, or otherwise allowed access to this information, to the search system 110. The suggestion service will rank the access location for the rental car center the highest.

In some implementations, the search system 110 may also provide data showing why certain access locations are rated higher than others. For example, assuming the first user has booked the flight on the airline that is located at terminal 4 of JFK International Airport, the data may be a message that explains that terminal 4 is the main terminal for that airline, e.g., "Your flight, Flight 123 on Airline A, depart from this terminal."

Other ways of ranking the access locations can also be used. For example, the access point processor 124 can access location data 126 of mobile device, which describes the locations of mobile devices over time, and determine traffic ratings for each of the access locations. The traffic rating is a measure of user device traffic thorough an access location by means of traffic counts. Access locations with high traffic ratings are ranked higher than access locations with lower traffic ratings. In some implementations, a user device may attribute a traffic count to a particular access location when the location data for that user device indicates the user device was within a threshold distance of the access location, or, based on the historical traffic data, indicates the user device was most likely to have passed through a particular access location relative to other access locations.

The process 200 generates access location query suggestions for the map query suggestion (208), and then provides the map query suggestions and the access location query suggestions in a format that causes the user device to display the access location query suggestions grouped subordinate to the map query suggestion (210). For example, as shown in FIG. 1B, the access location query suggestions 152 and 152, which identify access locations for JFK International Airport, are displayed such that they are subordinate to the map query suggestion 150 for JFK International Airport.

The number of access location query suggestions that are provided can vary. For example, in some implementations, a default number of access location query suggestions can be displayed. The default number may be two, as shown in FIG. 1B. However, should the query input be highly indicative of an information need for access points, then the number of access location query suggestions may be increased. This is illustrated in FIG. 1C. In response to the query input "Jfk t," the map query suggestion 150 and the web query suggestion 180 are shown. However, with reference to the map query suggestion 150, access location query suggestions 152, 154, 156, 158 and 160 are shown, and is a link 162 to show additional access points. This is because the query input "Jfk t" is a query stem that resolves to the query suggestions "Jfk Terminal . . . " with a very high likelihood.

Figure 3A:
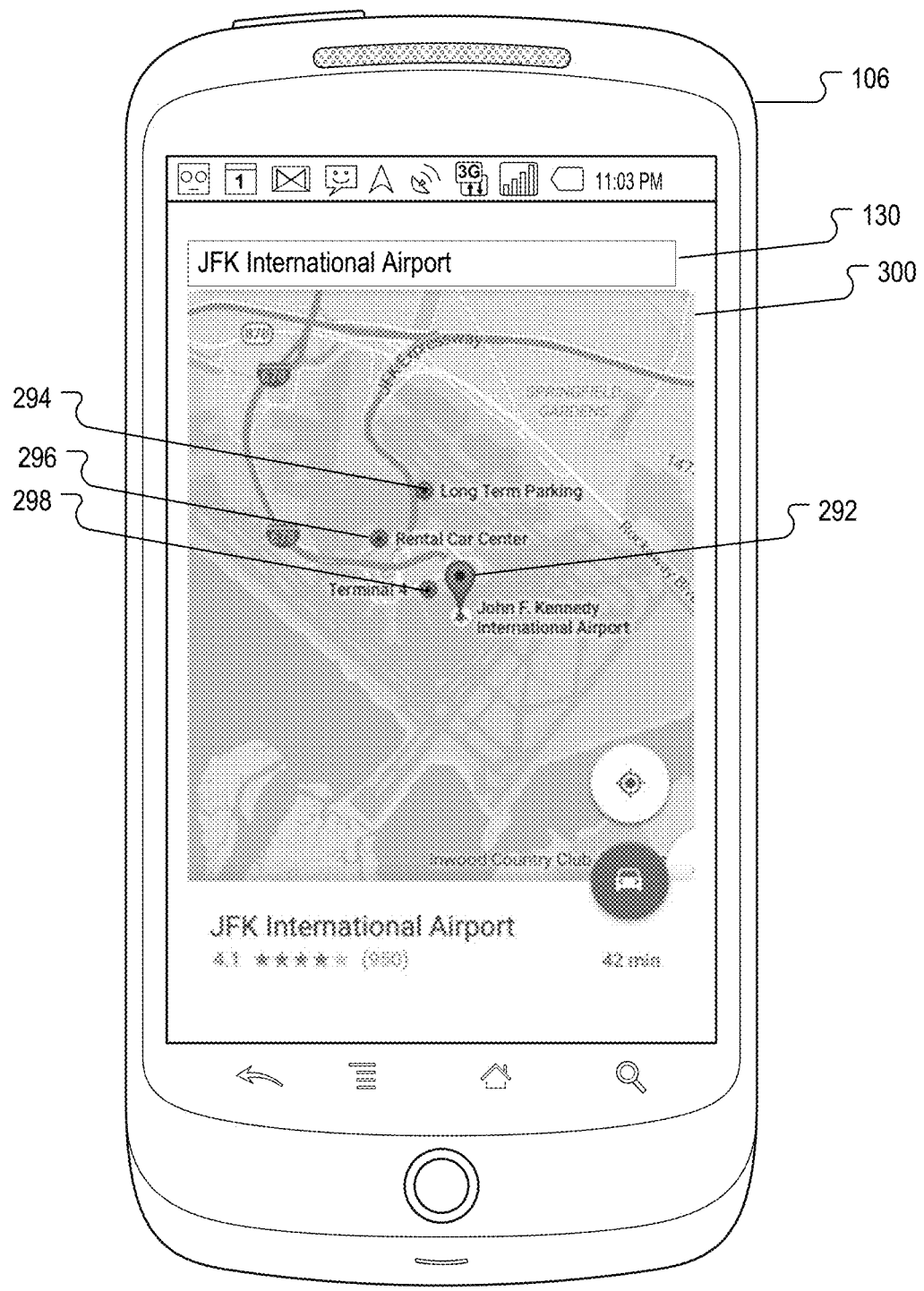
FIGS. 3A and 3B are illustrations of a map displayed in a user interface at two different zoom levels.

In some implementations, when a user selects either a map query suggestion or an access location query suggestion subordinate to the map query suggestion, the map service 120 provides data that causes the user device to display a map of an area that includes the locations of the query suggestions. In particular, the resulting map will display the physical entity location and the access locations corresponding to the access location query suggestions provided to the user device. The physical entity location will indicated by an icon of a first type and each access location is indicated by an icon of a second type that is different from the icon of the first type. To illustrate, assume the user selects the map query suggestion 150 in FIG. 1B; the resulting map that is provided is illustrated in FIG. 3A. The query input filed now reads "JFK International Airport," and the map in the user interface 300 includes a first icon 292 of a first type that corresponds to the location of the airport, and three icons 294, 296 and 298 of a second type that correspond to the access locations identified by the access location query suggestions shown in FIG. 1B. Additional access locations could also be shown, however.

While the example user interface in FIG. 3A is described as being displayed in response to selection of a map query suggestion, the same interface may be displayed in response to the entry of a map query without use of a map query suggestion. For example, assume that the user typed in the query "JFK International Airport" in a map application. The user interface 300, with the same entity locations and access locations, may still be provided as depicted in FIG. 3A.

Figure 3B:
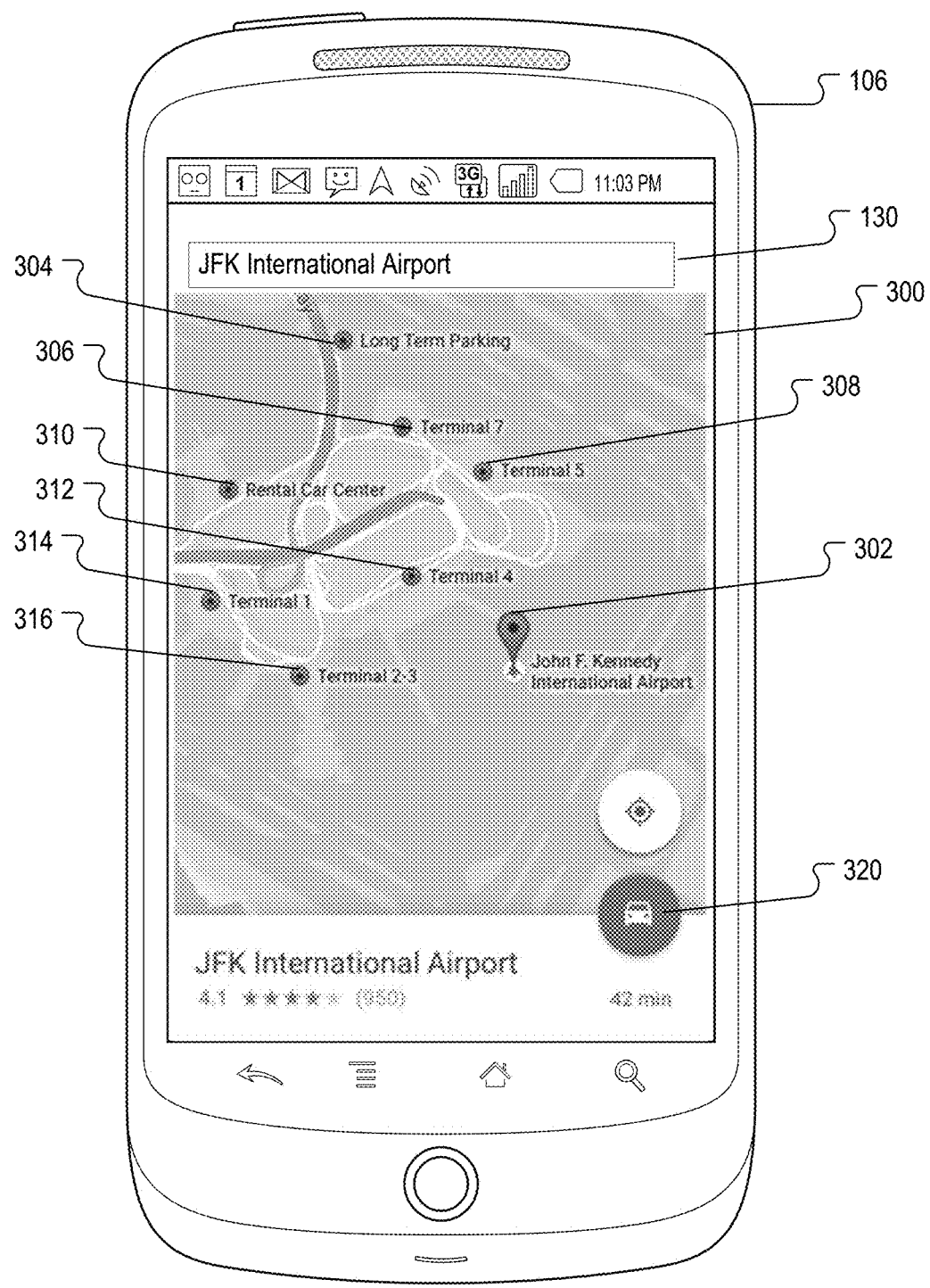

The map in the user interface 300 is displayed at a zoom level that is sufficient to show the access locations suggested in FIG. 1B. The user may zoom in or out, and in doing so the number of access locations associated with the physical entity may change. For example, as shown in FIG. 3B, the user has increased the zoom level from the zoom level of FIG. 3A, and in response, the maps service 120 provides data that causes the user device to display a new set of access locations 304, 306, 308, 310, 312, 314 and 316.

Figure 4:
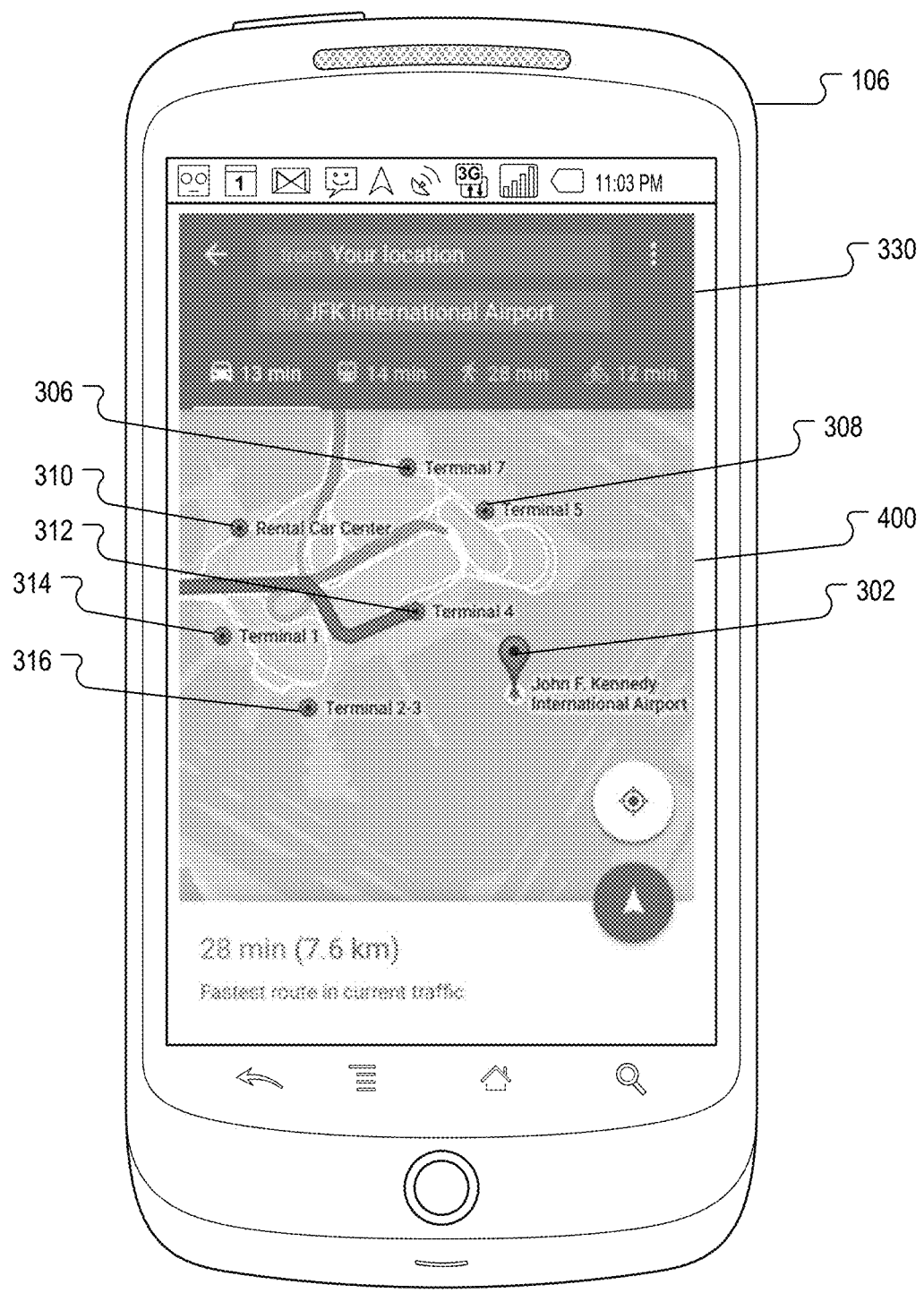
FIG. 4 is an illustration of a map user interface with route directions.

In some implementations, should the user select the directions command 320, the mapping service 120 will provide directions to the physical entity location 302 from the current location of the user device 106. However, should the user select a particular access point location, e.g., the access location 312 for Terminal 4, then the mapping service 120 will provide directions to the access location 312 from the current location of the user device 106. For example, FIG. 4 is an illustration of a map user interface 400 with route directions to a selected access point location 312.

Figure 5:
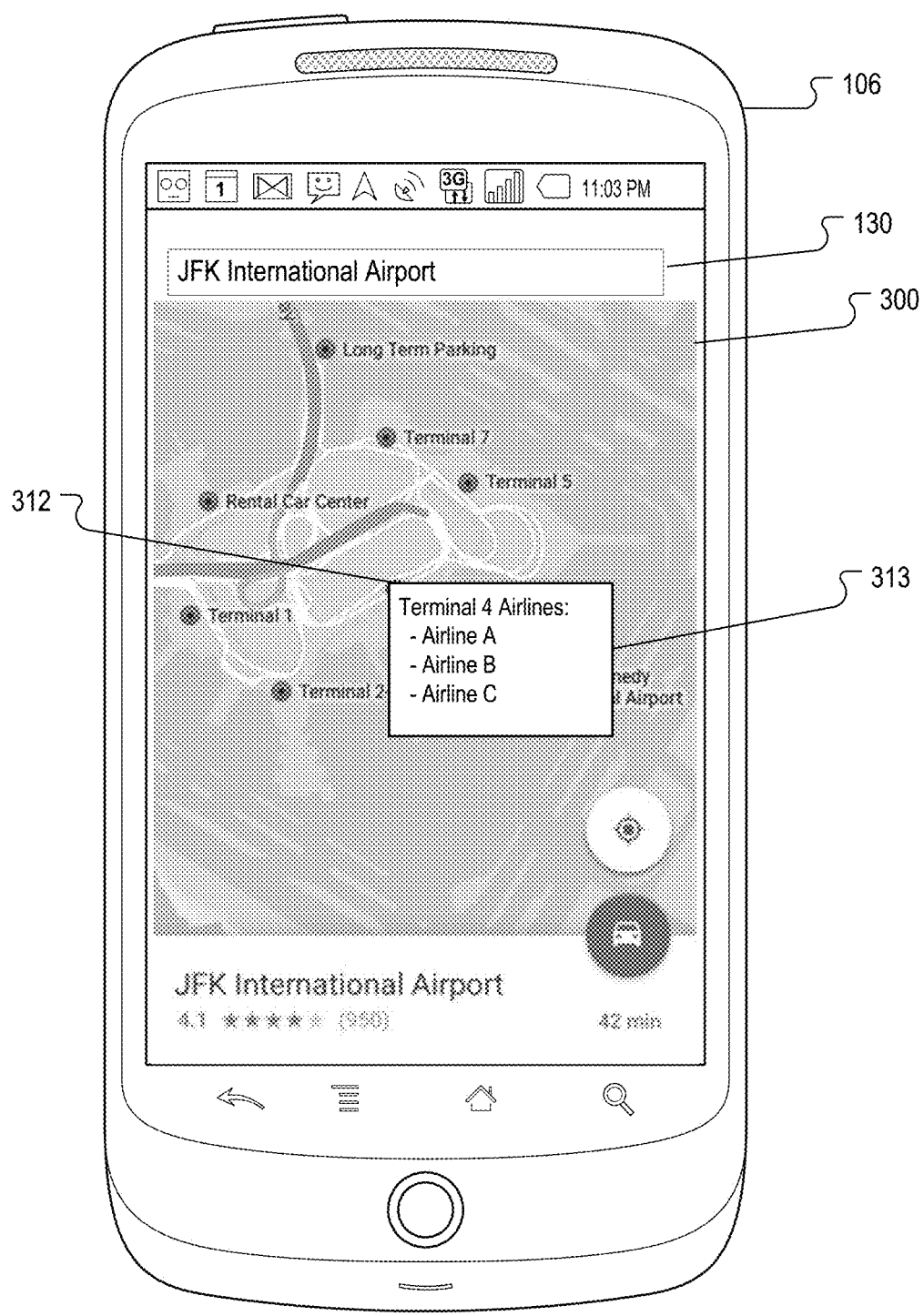
FIG. 5 is an illustration of a map user interface with access location metadata.

In some implementations, a user may select an access location point for a specified period of time, e.g., a "press and hold" selection, to cause the user device 106 to display metadata in a pop-up window for an access locational. The metadata describes physical features of the access point at the selected access location. For example, in FIG. 5, the user has selected the access location 312 for the specified period of time, e.g., two seconds, and a description of the airlines served by the specified airport terminal are displayed in a pop-up window 313. The metadata can be provided by a manager of the property or entity located at the physical entity location. By way of another example, for a parking deck access location, the daily rates for the parking deck may be displayed. Furthermore, some metadata may be specific to all access locations for a location. For example, for a sports arena, the metadata for each access location may also include a list of items that are prohibited from being brought into the arena.

While access locations for a particular building, area, or other identifiable map entity may be provided by a manager of the particular building, area, or other identifiable map entity, in some implementations, the access point processor 124 accesses location data of user device 106 to discover likely access points for a map entity.

Figure 6:
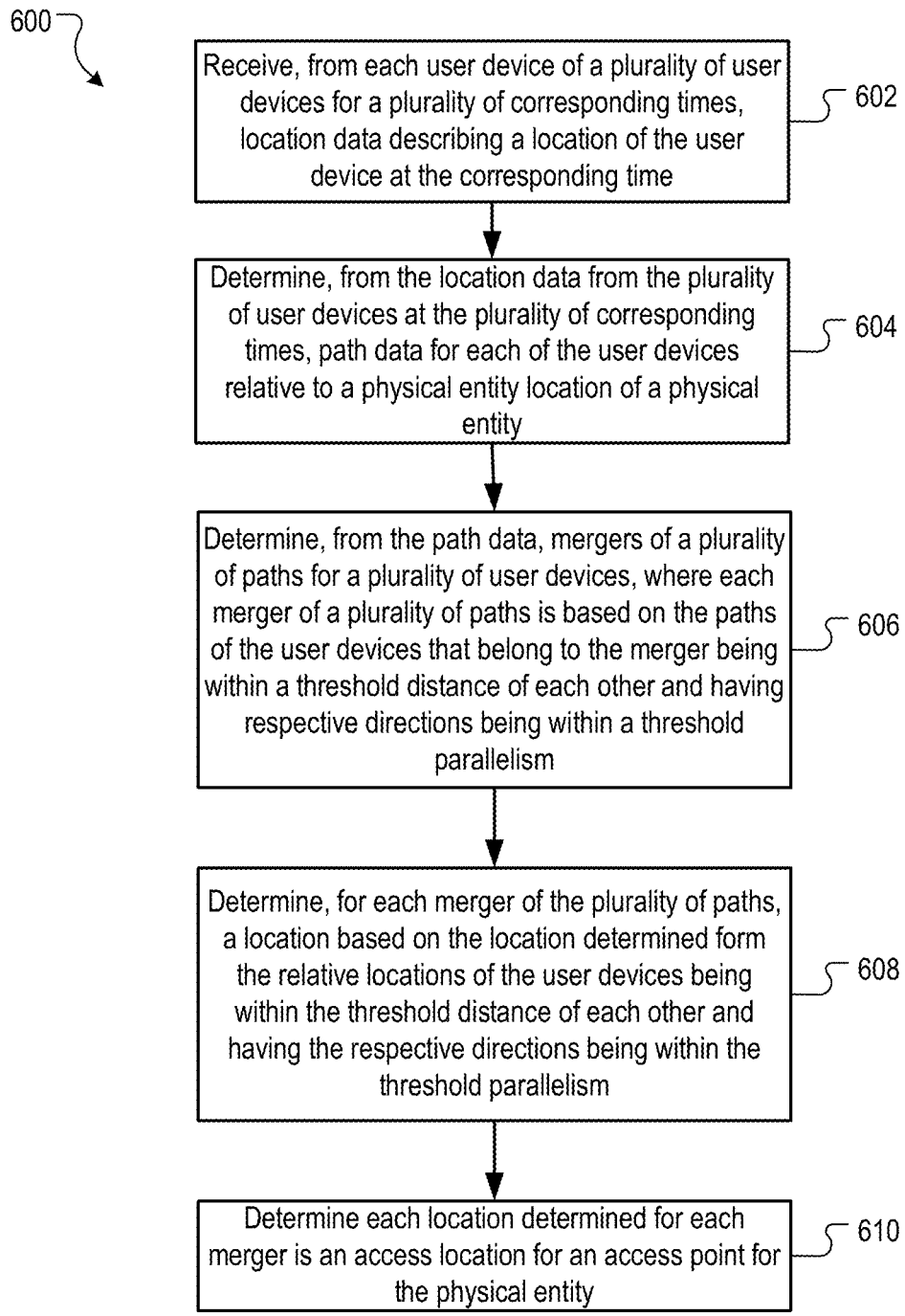
FIG. 6 is a flow diagram of an example process for discovering access locations from user device location data.

FIG. 6 is a flow diagram of an example process 600 for discovery access locations from user device location data. The process 600 can be implemented in a data processing apparatus, such as one or more server computers.

The process 600 receives, from each user device of a plurality of user devices for a plurality of corresponding times, location data describing a location of the user device at the corresponding time (602). In some implementations, the users of the user devices 106 have agreed to provide location data to the mapping service 120, and the location data for the user devices at multiple times (e.g., every n seconds) is stored in the location data 126.

The process 600 determines, from the location data from the plurality of user devices at the plurality of corresponding times, path data for each of the user devices relative to a physical entity location of a physical entity (604). For example, for the airport location 292 shown in FIG. 3A, the process 600 may identify paths of user devices within a set distance of the location 292. The set distance may vary based on the entity type. For an airport, for example, the distance may be 1 kilometer; for a building, the distance may be 25 meters; and so on. In other implementations, the process 600 may identify paths of user devices within a map area that corresponds to the identified location. A path for a user device is derived by the location of the user device over time.

The process 600 determines, from the path data, mergers of a plurality of paths for a plurality of user devices, where each merger of a plurality of paths is based on the paths of the user devices that belong to the merger being within a threshold distance of each other and having respective directions being within a threshold parallelism (606). A threshold parallelism occurs when two paths, or sub portions of the paths, are in substantially the same direction (or substantially the same bi-direction). For example, two paths that intersect almost perpendicularly do not meet a threshold parallelism, but two paths that are parallel to each other for a threshold duration, e.g., 6 meters, meet the parallelism threshold.

However, even when paths meet the parallelism threshold, they still may not merge unless they are within a threshold distance. For example, a threshold distance may be 5 meters. Two paths that meet a threshold parallelism and that are within a threshold distance of each other are indicative of an ingress/egress location.

The process 600 determines, for each merger of the plurality of paths, a location based on locations determined from the relative locations of the user devices being within the threshold distance of each other and having the respective sub-portions of the paths being within the threshold parallelism (608). For example, for N paths that are determined to be merged, the respective locations of the user devices for the merged portions of the paths are determined. From these locations that are relative to each other, an access point location may be determined. For example, a centroid of all the locations may be used to determine the access point location. The access point location is then determined to be a location of an access point for the physical entity (610). The determined access points are then stored in a data store for later access by the map service 120.

Figure 7:
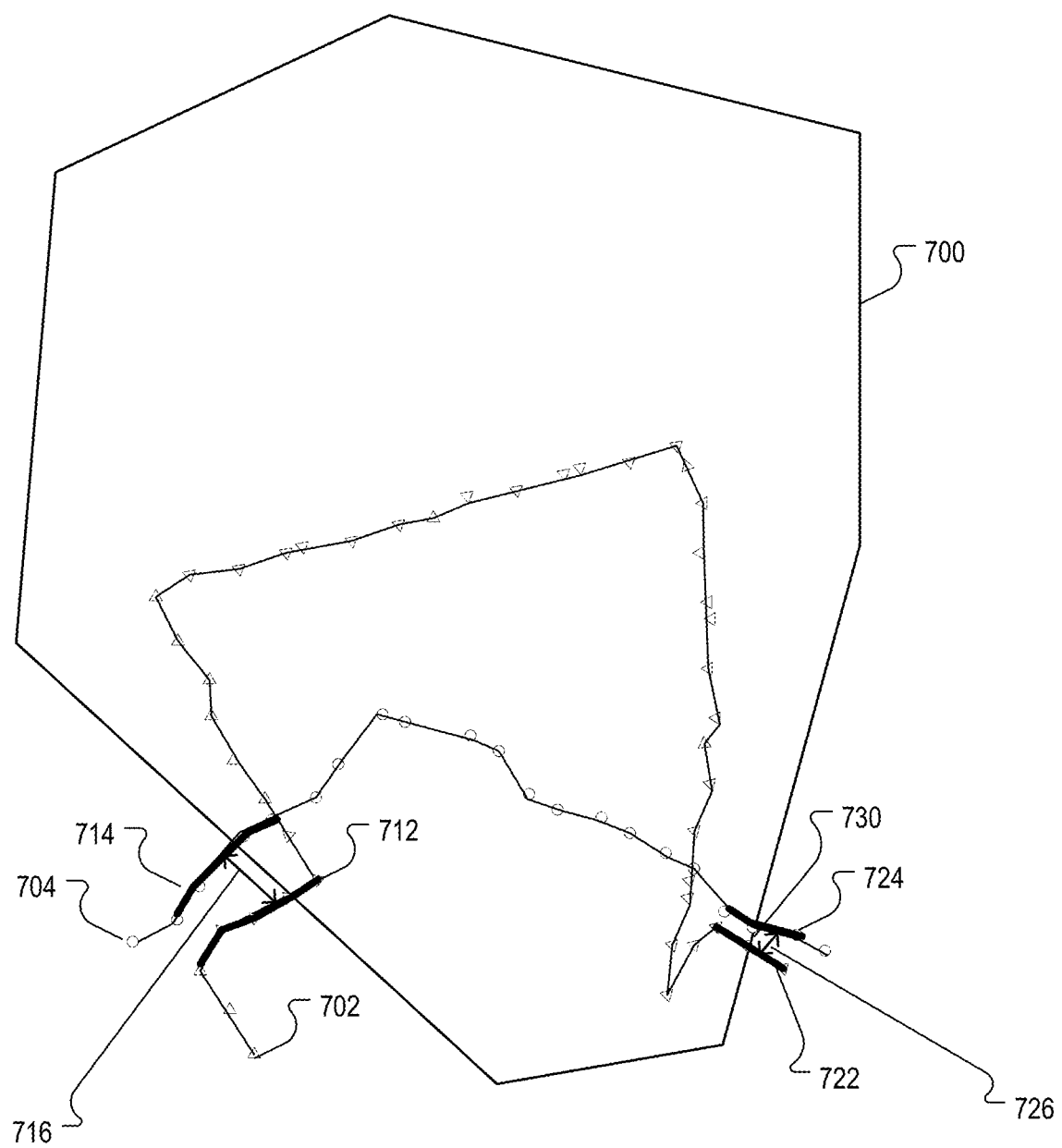
FIG. 7 is an illustration of a discovered access location from user device location data.

FIG. 7 is an illustration of a discovered access location from user device location data. An area of a map entity 700 is processed for path data as described above with reference to FIG. 6. Two illustrative paths —702 and 704—for two respective user devices are discovered. Although only two paths are shown, many hundreds of paths may actually be processed for a particular location.

Two respective first sub portions 712 and 714 of the paths 702 and 704 meet a parallelism threshold, and two respective second sub portions 722 and 722 of the paths 702 and 704 also meet a parallelism threshold. One example way of determining whether two sub-portions of two paths meet a threshold parallelism is to interpolate a straight line for each sub-portion. Thereafter, the relative angels between the straight lines is determined. If the relative angle is less than a threshold angle, e.g., 10 degrees, then the two sub-portions of the paths meet the parallelism threshold.

The respective distances between the paths are represented by arrows 716 and 726. The distance represented by arrow 716 is larger than the threshold distance for a merger, and thus the sub-portions 712 and 714 do not merge. However, the distance represented by the arrow 726 is within the threshold distance, and thus the sub-portions 722 and 724 merge. Accordingly, an access location 730 is determined for the map entity 700.

One example way of determining a threshold parallelism for two sub-portions is to interpolate a straight line for each sub-portion, and then find the closes points between the two lines. If the closes point is less than a threshold distance, e.g., 4 meters, then the two sub-portions of the paths meet the threshold distance.

In some implementations, there must be a threshold number of merged paths before an access location is determined. The threshold number may be a fixed number, e.g., 100, or, alternatively, may be a number dependent on the number of paths discovered, e.g., at least 5% of the paths discovered must merge in a particular location for an access point to be determined.

In situations in which the systems discussed herein collect personal information about users, or may make use of personal information, the users may be provided with an opportunity to control whether programs or features collect user information (e.g., information about a user's social network, social actions or activities, profession, a user's preferences, a user's current location, location trajectory, inferred locations such as home/work, inferred context, calendar data, upcoming events/bookings from email, etc.), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving a map query;
identifying a point of interest that satisfies the map query;

identifying multiple access points that have previously been associated with the point of interest, wherein each access point comprises an entrance to the point of interest;

ranking the multiple access points based on user device traffic rating information associated with the multiple access points, wherein selectable icons are provided for each of the ranked multiple access points;

in response to the map query, providing, for output, a map including a respective, selectable icon for each of (i) the point of interest that satisfies the map query and (ii) each of the ranked multiple access points that have previously been associated with the point of interest, wherein the respective, selectable icon for each of the ranked multiple access points that have previously been associated with the point of interest is operable, when selected, to invoke a process for returning navigation directions specific to the ranked access point that corresponds to the respective, selectable icon, wherein the navigation directions specific to at least two of the ranked multiple access points are at least partially different from each other;

receiving data indicating that a particular icon has been selected; and providing, for output, directions based on the particular icon that has been selected.

2. The method of claim 1, wherein identifying multiple access points that have previously been associated with the point of interest comprises identifying parking lots that have previously been associated with an agent of the point of interest.

3. The method of claim 1, wherein, before the map query is received, data indicating the multiple access points is received from a building manager associated with the point of interest.

4. The method of claim 1, wherein identifying multiple access points that have previously been associated with the point of interest comprises identifying different terminals that have previously been associated with the point of interest.

5. The method of claim 1, comprising providing, for output, information explaining a reason for ranking at least one of the ranked multiple access points.

6. The method of claim 1, comprising providing, for output over the map, a pop-up window that displays metadata associated with the particular icon that has been selected.

7. The computer-implemented method of claim 1, wherein the particular icon is a respective, selectable icon for a particular one of the ranked multiple access points that has previously been associated with the point of interest, and wherein providing, for output, directions based on the particular icon that has been selected comprises providing, for output, directions specific to the particular one of the ranked multiple access points.

8. The computer implemented method of claim 1, wherein:

the respective, selectable icon for a first of the ranked multiple access points associated with the point of interest is operable, when selected, to invoke a process for returning a first set of navigation directions for navigating a first route to the first of the ranked multiple access points;

the respective, selectable icon for a second of the ranked multiple access points associated with the point of interest is operable, when selected, to invoke a process for returning a second set of navigation directions for navigating a second route to the second of the ranked multiple access points; and the first route is at least partially different from the second route.

9. A non-transitory computer-readable storage device storing software comprising instructions executable by one or more computers which, upon such execution, cause the one or more computers to perform operations comprising:

receiving a map query;

identifying a point of interest that satisfies the map query;

identifying multiple access points that have previously been associated with the point of interest, wherein each access point comprises an entrance to the point of interest;

ranking the multiple access points based on user device traffic rating information associated with the multiple access points, wherein selectable icons are provided for each of the ranked multiple access points;

in response to the map query, providing, for output, a map including a respective, selectable icon for each of (i) the point of interest that satisfies the map query and (ii) each of the ranked multiple access points that have previously been associated with the point of interest, wherein the respective, selectable icon for each of the ranked multiple access points that have previously been associated with the point of interest is operable, when selected, to invoke a process for returning navigation directions specific to the ranked access point that corresponds to the respective, selectable icon, wherein the navigation directions specific to at least two of the ranked multiple access points are at least partially different from each other;

receiving data indicating that a particular icon has been selected; and providing, for output, directions based on the particular icon that has been selected.

10. The device of claim 9, wherein identifying multiple access points that have previously been associated with the point of interest comprises identifying parking lots that have previously been associated with an agent of the point of interest.

11. The device of claim 9, wherein, before the map query is received, data indicating the multiple access points is received from a building manager associated with the point of interest.

12. The device of claim 9, wherein identifying multiple access points that have previously been associated with the point of interest comprises identifying different terminals that have previously been associated with the point of interest.

13. The device of claim 9, wherein ranking the multiple access points is further based on historical user information associated with the multiple access points.

14. The device of claim 9, wherein the operations comprise providing, for output over the map, a pop-up window that displays metadata associated with the particular icon that has been selected.

15. A system comprising:

one or more computers and one or more storage devices storing instructions that are operable, when executed by the one or more computers, to cause the one or more computers to perform operations comprising:

receiving a map query;

identifying a point of interest that satisfies the map query;

identifying multiple access points that have previously been associated with the point of interest, wherein each access point comprises an entrance to the point of interest;

ranking the multiple access points based on user device traffic rating information associated with the multiple access points, wherein selectable icons are provided for each of the ranked multiple access points;

in response to the map query, providing, for output, a map including a respective, selectable icon for each of (i) the point of interest that satisfies the map query and (ii) each of the ranked multiple access points that have previously been associated with the point of interest, wherein the respective, selectable icon for each of the ranked multiple access points that have previously been associated with the point of interest is operable, when selected, to invoke a process for returning navigation directions specific to the ranked access point that corresponds to the respective, selectable icon, wherein the navigation directions specific to at least two of the ranked multiple access points are at least partially different from each other;

receiving data indicating that a particular icon has been selected; and providing, for output, directions based on the particular icon that has been selected.

16. The system of claim 15, wherein identifying multiple access points that have previously been associated with the point of interest comprises identifying parking lots that have previously been associated with an agent of the point of interest.

17. The system of claim 15, wherein, before the map query is received, data indicating the multiple access points is received from a building manager associated with the point of interest.

18. The system of claim 15, wherein identifying multiple access points that have previously been associated with the point of interest comprises identifying different terminals that have previously been associated with the point of interest.

19. The system of claim 15, wherein ranking the multiple access points is further based on historical user information associated with the multiple access points.

* * * * *